Patented Apr. 2, 1946

2,397,542

UNITED STATES PATENT OFFICE 2,397,542

ALKYLATION

Alfred W. Francis, Woodbury, N. J., and Ebenezer E. Reid, Baltimore, Md., assignors to Socony-Vacuum Oil Company, Incorporated, New York, N. Y., a corporation of New York No Drawing. Application September 30, 1941,
Serial No. 412,956

5 Claims. (Cl. 260—671)

This invention pertains to an alkylation process and is specifically concerned with the preparation of monoalkyl benzenes by reaction of benzene with olefins in the presence of a Friedel-Crafts type catalyst.

Benzene can be ethylated readily with ethylene (or ethyl chloride) in the presence of a catalyst such as aluminum chloride at atmospheric pressure and temperatures ranging from 40° to 80° C., both limits being determined by the rate of reaction which decreases sharply at higher temperatures and is relatively low within the upper part of the said range because of the limited solubility of ethylene near the boiling point of benzene.

Yields of ethyl benzene obtained by processes of the prior art are always low however, because the desired product is ethylated at least as readily as the benzene, thus consuming ethylene for the formation of less desirable polyethyl benzenes and converting product already formed to by-products. A mathematical analysis of data obtained from these ethylene reactions seems to indicate that the second ethylation proceeds at about three times the velocity of the first. Reaction of one-third of a mol of ethylene with one mol of benzene normally yields about 0.16 mol of ethyl benzene under the conditions of most prior art processes, thus utilizing only about 48% of the ethylene in formation of desired product. The use of more ethylene may increase the yield of product based on benzene from 16% up to a maximum of about 19%, but the yield based on ethylene drops rapidly.

Attempts have been made to overcome the above-mentioned difficulties without notable success. Some increases in yield up to 21% based on benzene have been reported by use of processes consuming an inordinate period of time.

We have now found that the yield of alkyl benzene by treatment of benzene with olefins in the presence of aluminum chloride or other Friedel-Crafts type catalysts may be greatly increased by conducting the reaction at temperatures on the order of 100° C. and above, preferably from about 100° C. to about 150° C. under substantial pressure in excess of atmospheric, preferably between about 100 and 300 pounds per square inch. Good results are obtained with amounts of catalyst varying between about 0.02 and 0.10 mol per mol of benzene. The increases in yield obtained by practicing the principles of this invention are substantial. For example, the reaction of one-third mol of ethylene with one mol of benzene at elevated temperature gives a yield of 80% based on ethylene or 29% on benzene. The advantages of the invention become even more striking as the mol ratio of ethylene to benzene, hereinafter referred to as M, is increased. Thus when M is 0.9, the yield is 53% on ethylene or 48% on benzene, as compared with yields of 21% and 19% respectively, obtained in the usual process below 80° C.

A further and very important advantage lies in the speed of the reaction. In the above instance where M equals 0.33, the reaction was completed in 3 minutes as compared with a process of the prior art reportedly giving an increased yield on a reaction time of 4.75 hours with the same mol ratio of reactants.

A possible explanation of the improved results obtained by the present invention is based on mutual solubilities of the components of the system. The catalyst forms a lower liquid layer in a two phase liquid system with the benzene lying thereabove. Alkyl benzenes being soluble in the liquid catalyst to a much greater extent than benzene are extracted from the upper hydrocarbon layer and concentrated in the catalyst. Since the aluminum chloride is relatively insoluble in benzene at temperatures employed in prior art processes; alkylation reactions are catalyzed to a much greater extent in the lower layer of concentrated catalyst. The alkylation reaction being restricted almost exclusively to the lower layer, it is to be expected that the alkyl groups shall be substituted on the product to a considerably greater extent than on the benzene.

At the higher temperatures of the present process, the solubility of aluminum chloride in benzene is increased to such an extent that ethylation in the upper layer is catalyzed vigorously and proceeds rapidly, with extraction of ethyl benzene by the lower layer, removing it from the zone of reaction and thus inhibiting formation of polyalkyl benzenes to a substantial extent. The gaseous olefin is added above the liquid system and is therefore available for alkylation of benzene while not available for alkylation of alkyl benzene as would be the case were this reagent bubbled through the reaction mass. Experimental results tend to substantiate this theory, it being indicated the reaction rate for the first substitution with ethylene under the conditions of this invention is roughly twice the rate of substitution in subsequent positions on the benzene molecule; as compared with the ratio of 1 to 3 for these rates, respectively, in the low temperature ethylation processes of the prior art. The theory is further supported by a finding that the rate of substitution of ethyl groups in all six successive reactions is apparently the same when a solvent such as ethyl ether for all components of the reaction mass including reactants, catalysts, product and by-products is added to form a single homogeneous liquid phase.

Example I

An autoclave of 290 ml. capacity was charged with 2.26 mols of pure benzene and 0.075 mol of aluminum chloride and heated in a water bath to a temperature of 100° C., which temperature was maintained throughout the course of the reaction. The mixture was continuously agitated during the reaction by a single propeller type agitator near the bottom of the autoclave. Ethylene was added directly from a cylinder under a pressure of 300 pounds per square inch from a cylinder for three minutes, 0.81 mol of the gas being charged to the autoclave. M=0.36. The autoclave was then cooled and opened, the contents poured out and the two layers weighed separately, it being found that the lower layer weighed 26 grams while the upper weighed 190 grams. The upper layer was washed with water and the lower layer decomposed by gradual addition to water. The hydrocarbon portions from each layer were combined and fractionally distilled through a column and the several products of the reaction weighed separately. There were recovered 1.53 mols of benzene, 0.65 mol of ethyl benzene and 0.08 mol of diethyl benzene, a yield of 29% ethyl benzene on benzene or 80% on ethylene.

Example II 2.14 mols of benzene and 0.075 mol of aluminum chloride were treated with 1.48 mols of ethylene (M=0.69) at 100° C. and a pressure of 200 pounds per square inch for 60 minutes. The hydrocarbons in the resultant reaction mass consisted of 0.92 mol benzene, 0.98 mol ethyl benzene, 0.22 mol diethyl benzene and 0.02 mol triethyl benzene; a yield of 46% ethyl benzene on benzene or 66% on ethylene.

Example III

In another run using 2.18 mols benzene, 1.46 mols ethylene (M=0.67) and 0.12 mol aluminum chloride at 100° C. and 150 pounds per square inch for a reaction time of 45 minutes; there were obtained 0.98 mol benzene, 0.97 mol ethyl benzene, 0.20 mol diethyl benzene and 0.03 mol triethyl benzene. The yield of desired product was 44% on benzene or 66% on ethylene.

Example IV

Treatment of 2.04 mols of benzene and 0.12 mol of aluminum chloride with 1.83 mols of ethylene (M=0.90) at 107° C. and 200 pounds per square inch pressure for 60 minutes resulted in 0.67 mol benzene, 0.97 mol ethyl benzene, 0.34 mol diethyl benzene and 0.06 mol triethyl benzene. The yield of ethyl benzene on benzene is found to be 48% and on ethylene 53%.

Example V

Reaction of 1.83 mols benzene, 1.10 mols ethylene (M=0.60) and 0.09 mol aluminum chloride at 150° C. and 200 pounds per square inch for 60 minutes gave 0.90 mol benzene, 0.74 mol ethyl benzene, 0.13 mol diethyl benzene and 0.05 mol triethyl benzene; a yield of 40% ethyl benzene based on benzene or 67% based on ethylene.

Example VI 2.23 mols benzene were reacted with 1.69 mols ethylene (M=0.76) in the presence of 0.075 mol aluminum chloride at 100° C. and 250 pounds per square inch for 10 minutes. The recovered hydrocarbons consisted of 0.88 mol benzene, 1.03 mols ethyl benzene, 0.29 mol diethyl benzene and 0.02 mol triethyl benzene. A yield of 47% ethyl benzene based on benzene and 61% on ethylene.

Example VII 1.95 mols benzene were reacted with 1.04 mols propylene (M=0.53) in the presence of 0.11 mol aluminum chloride at 100° C. and 150 pounds per square inch for 3 minutes. The recovered hydrocarbons consisted of 1.03 mols benzene, 0.80 mol isopropyl benzene (cumene) and 0.12 mol diisopropyl benzene; a yield of cumene of 41% based on benzene and 77% on propylene. The process is adaptable to alkylation with other gaseous olefins, such as butylenes, etc.

It was noted that alkylations performed at the present higher temperatures gave products free of the more highly substituted hexaethyl benzene which is normally found as crystals in the distillation residue at 200° C. during fractional distillation of products from low temperature ethylations of the prior art.

While the present examples are presented as batch processes, the concepts of the invention are admirably adapted to continuous operation. The upper layer may be continuously withdrawn and cooled to precipitate the major portion of the catalyst contained therein in a form suitable for recycling to the reaction mass with fresh benzene. In such operation it is found advisable to introduce an activator such as hydrogen chloride with the fresh charge, preferably with the gaseous reactant, in order to maintain a high rate of reaction.

We claim:
1. A process for preparing ethyl benzene which comprises agitating a liquid mass including aluminum chloride and benzene at a temperature of approximately 100° C. for a period of approximately ten minutes and simultaneously maintaining an atmosphere of ethylene above a liquid mass under said pressure of more than 200 pounds per square inch.

2. A process for preparing ethyl benzene, which comprises contacting benzene with aluminum chloride, at temperatures varying between about 100° C. and about 150° C., and maintaining an atmosphere of ethylene over said benzene and aluminum chloride at pressures of at least 100 pounds per square inch.

3. A process for preparing ethyl benzene, which comprises contacting benzene with aluminum chloride, at temperatures varying between about 100° C. and about 150° C., and maintaining an atmosphere of ethylene over said benzene and aluminum chloride at pressures varying between about 100 pounds per square inch and about 300 pounds per square inch.

4. A process for preparing ethyl benzene, which comprises contacting benzene with aluminum chloride, at temperatures varying between about 100° C. and about 150° C., and maintaining an atmosphere of ethylene over said benzene and aluminum chloride at pressures of at least 100 pounds per square inch, said aluminum chloride being present in an amount of about 0.02 to 0.10 mol per mol of benzene at the beginning of said process.

5. A process for preparing ethyl benzene, which comprises contacting benzene with aluminum chloride, at temperatures varying between about 100° C. and about 150° C., and maintaining an atmosphere of ethylene over said benzene and aluminum chloride at pressures varying between about 100 pounds per square inch and about 300 pounds per square inch, said aluminum chloride being present in an amount of about 0.02 to 0.10 mol per mol of benzene at the beginning of said process.

ALFRED W. FRANCIS.
EBENEZER E. REID.